United States Patent [19]
Cross

[11] Patent Number: 6,045,851
[45] Date of Patent: Apr. 4, 2000

[54] METHOD OF PRODUCING PUFFED PASTA PRODUCTS

[75] Inventor: James C. Cross, Overland Park, Kans.

[73] Assignee: Shade Foods, Inc., New Century, Kans.

[21] Appl. No.: 09/164,745

[22] Filed: Oct. 1, 1998

[51] Int. Cl.$^7$ ...................................................... A23P 1/00
[52] U.S. Cl. ........................ 426/557; 426/467; 426/516; 426/496; 426/517; 426/451
[58] Field of Search ................................... 426/557, 467, 426/516, 496, 517, 451

[56] References Cited

U.S. PATENT DOCUMENTS

| | | | |
|---|---|---|---|
| 4,238,514 | 12/1980 | Martin et al. ............................. | 426/62 |
| 4,620,981 | 11/1986 | Gordon et al. ........................... | 426/448 |
| 5,024,996 | 6/1991 | Ringe ........................................ | 514/54 |
| 5,059,439 | 10/1991 | Wenger et al. .......................... | 426/451 |
| 5,108,772 | 4/1992 | Wilbur ..................................... | 426/559 |
| 5,128,166 | 7/1992 | Babines et al. .......................... | 426/557 |
| 5,476,675 | 12/1995 | Lou et al. ................................ | 426/590 |
| 5,501,868 | 3/1996 | Collings et al. ......................... | 426/623 |
| 5,858,431 | 1/1999 | Wiedersatz .............................. | 426/242 |

*Primary Examiner*—David Lacey
*Assistant Examiner*—Philip DuBois
*Attorney, Agent, or Firm*—Hovey, Williams Timmons & Collins

[57] ABSTRACT

An improved, non-fried expanded snack product is provided which is fabricated by extruding ingredients comprising a pasta flour followed by subjecting the extrudate to a two-step drying process. The extrusion process preferably makes use of a twin screw extruder and a slow screw rotation rate. Prior to each drying step, the product is agitated in air in order to reduce clumping of the wet material. The air agitation of the product should be carried out at temperatures which are less than the temperatures utilized in each of the drying steps, and preferably at ambient temperatures. The drying steps are preferably carried out in two separate drying apparatuses, and the air agitation comprises air conveying the product to each of the drying steps. A preferred air conveying device is a conventional cyclone separator.

34 Claims, 2 Drawing Sheets

METHOD OF PRODUCING PUFFED PASTA PRODUCTS

BACKGROUND OF THE INVENTION

1. Field of the Invention

The present invention is broadly concerned with improved hot air expandable pasta snack products, as well as a method of fabricating such products. More particularly, it is concerned with non-fried snacks which comprise a pasta flour and are low in fat while at the same time achieving the fluffy, light texture typical of fried, high-fat pasta snacks. These snacks are fabricated by extrusion processes carried using slow screw rotation speeds, followed by two drying steps. Before each stage of drying, the product is preferably agitated by air having a temperature lower than the temperatures of the drying apparatuses. The final product can be coated with various flavorings and hot air expanded in a manner similar to popcorn to yield a desirable snack product.

2. Description of the Prior Art

For many years, the snack industry has been dominated by fried foods. Recently however, non-fried snacks have become increasingly popular in light of the health concerns raised by the fat and cholesterol levels in fried foods. The chief obstacle in manufacturing non-fried snacks is that these non-fried snacks are generally not comparable to fried snacks in terms of flavor, texture, and appearance.

Many types of snacks are manufactured utilizing extruder technology. For example, corn-based snacks can be produced by expanding a corn-based extruded product. This is how corn curl and corn puff snacks are manufactured. Pasta snacks are generally made via a two-stage process wherein a starting flour/water mixture including pasta flour (e.g., Durum or Semolina) is first extruded, followed by drying of the extrudate and frying. However, this latter method results in a pasta snack product that is high in fat—generally about 10% by weight of fat, based on the total weight of the product—and thus not very healthy for consumers. However, in the past frying has been necessary in order to achieve a light, fluffy pasta snack with an appealing texture.

SUMMARY OF THE INVENTION

The present invention overcomes the above problems by providing non-fried, low-fat pasta snacks (and corresponding methods of production thereof) which have an appealing light texture similar to that of high-fat, fried pasta snacks.

Broadly speaking, the method involves introducing ingredients comprising a pasta flour and water into and through an extruder to form an at least partially cooked extrudate. The extrudate is then cut and transferred (preferably by air conveying) to a first drying apparatus for partially drying the extruded product using heated air of a first elevated temperature. The partially dried product, which is usually somewhat clumped owing to the moisture level thereof, is then agitated in air (normally ambient) having a temperature lower than the first drying air temperature, thus reducing the clumping of the material. Normally, the agitating step is carried out at ambient temperatures. Preferably, this air agitation step comprises air conveying the product to a second drying apparatus having heated air of a second elevated temperature which is higher than the temperature of the agitating/conveying air. Alternately, if use of a second drying apparatus is not feasible, the product can be returned to the first drying apparatus for further drying after air agitation. After the second drying step, the product can be transferred to a toaster oven for further cooking, or can be further processed with flavorings and sold.

The final product can be hot air expanded into a light textured, low-fat pasta snack product by subjecting the product to hot air having a temperature of from about 380–420° F. and an air velocity of at least about 1750 ft$^3$/min. The expanded product will have an actual density (i.e., the density of the individual product piece as opposed to the bulk density) of from about 0.25–0.5 g/cm$^3$, and preferably from about 0.3–0.45 g/cm$^3$. As used hereinafter, density refers to actual or true density rather than bulk density. Furthermore, because it is not necessary to fry the product, the expanded product has a total fat content of less than about 2% by weight based upon the total weight of the product, and preferably less than about 1% by weight.

DETAILED DESCRIPTION OF THE PREFERRED EMBODIMENT

Figure 1:
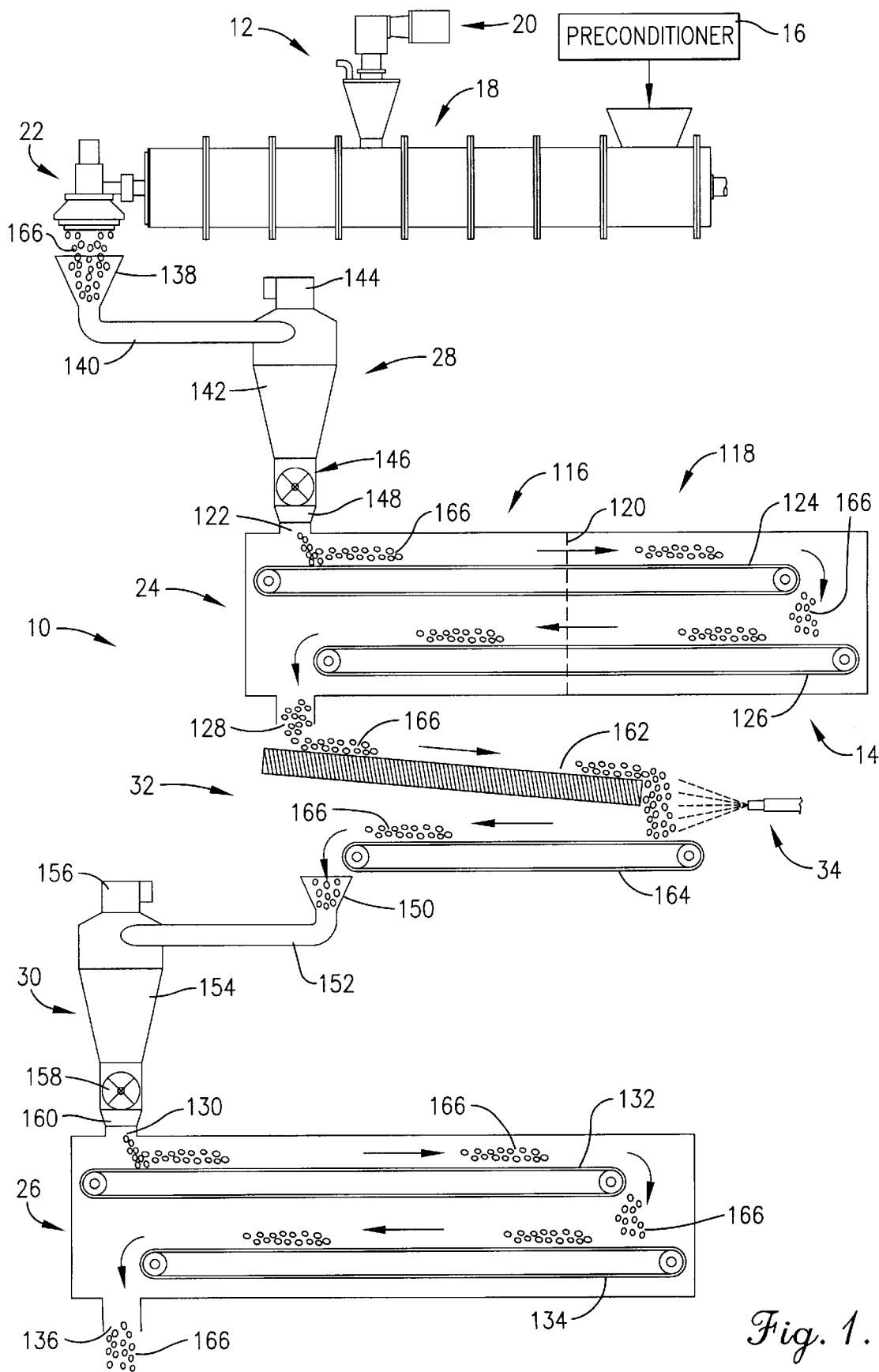
FIG. 1 is a schematic drawing illustrating the equipment set-up in a preferred embodiment of the methods of the invention.

Turning now to the drawings, a non-fried pasta-forming plant 10 is illustrated in FIG. 1. Broadly speaking, the plant 10 includes an extrusion assembly 12 and a drying assembly 14. The extrusion assembly 12 includes a preconditioner 16, an extruder 18, a venting device 20, and a pasta die housing 22. The drying assembly 14 includes a first dryer 24, a second separate dryer 26, a first cyclone separator 28, a second cyclone separator 30, a conveyer assembly 32, and a spraying mechanism 34.

In more detail, the preconditioner 16 is designed to initially moisturize and partially precook dry ingredients prior to the entrance thereof into extruder 18. To this end, the preconditioner 16 is typically in the form of an elongated chamber equipped with rotatable internal paddles as well as injection ports for water and/or steam. A variety of preconditioners may be used in the context of the invention.

Figure 2:
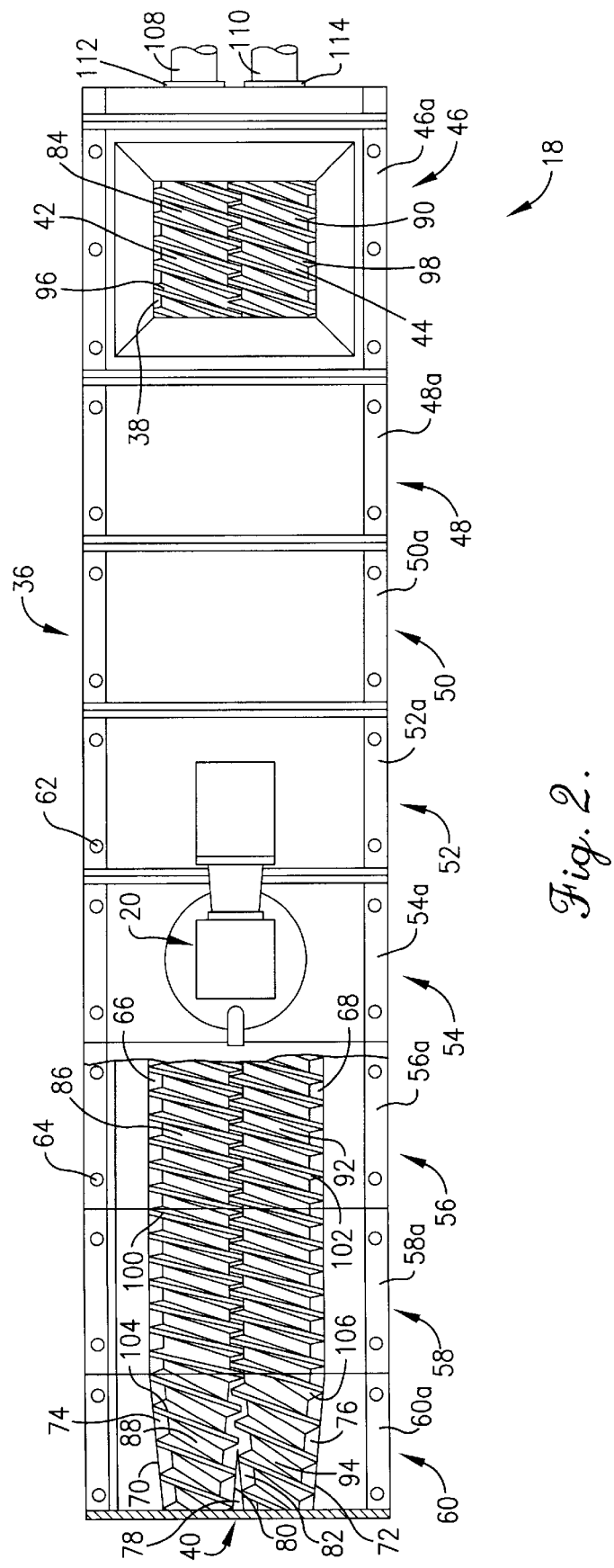
FIG. 2 is a fragmentary, sectional plan view illustrating the barrel and screw of the preferred twin screw extruder used in the invention.

In the embodiment illustrated in FIG. 2, the extruder 18 includes an elongated barrel 36 having a material inlet 38 adjacent the rear end thereof and a material outlet 40 at the end of barrel 36 remote from inlet 38. In addition, the overall extruder 18 includes a pair of elongated, juxtaposed, axially rotatable, substantially parallel flighted screws 42, 44 situated within barrel 36 and serving to transport material from inlet 38 along the length of the barrel and through the outlet 40.

Barrel 36 includes a tubular inlet head 46, six intermediate tubular heads 48, 50, 52, 54, 56, and 58, and a final tubular outlet head 60. Each of the heads 46–60 is made up of interconnected half-head sections, with only the upper sections 46a–54a of heads 46–54 and the lower sections 56a–60a of heads 56–60 being depicted in FIG. 2. However, each of the upper sections 46a–54a includes a corresponding mated lower half section and each of the lower sections 56a–60a includes a corresponding mated upper half section. The upper and lower half sections of each head are bolted with bolts 62 through apertures 64 provided along the side margins of the half-head sections. Moreover, the heads are connected in an aligned, end-to-end manner through provision of apertured endmost flange structure provided on the opposed ends of each head and by means of appropriate connecting bolts (not shown). The interconnected heads making up the overall barrel 36 serve to define an inner tubular region presenting side-by-side, elongated, parallel, lengthwise interconnected frustrocylindrical zones 66 and 68 for receiving the respective screws 42, 44.

The inlet head 46 and intermediate heads 48–58 are for the most part conventional. Outlet head 60 is configured to present a pair of separate generally tubular, juxtaposed head sections 70, 72. Each of the head sections 70, 72 is of decreasing cross-sectional area along its length, and is preferably frustroconical in shape. To this end, outlet head 60 includes a pair of converging, arcuate, outboard sidewalls 74, 76 along with a central arcuate wall 78. The wall 78 presents a pair of arcuate converging surfaces 80, 82 which merge into the respective opposed outboard sidewalls 74, 76. Thus, the wall structure of head 60 serves to define a pair of side-by-side, generally tubular, frustroconical head sections 70, 72. The section 70 is defined by wall 74 and surface 80, whereas the section 72 is defined by wall 76 and surface 82.

The screws 42, 44 are made up of a series of axially interconnected flighted sections which present an inlet or feed section, an intermediate section, and a nose section for each of the screws. Thus, the screw 42 includes a flighted inlet or feed section 84, an intermediate section 86, and a nose section 88. In like matter, the screw 44 has an inlet section 90, an intermediate section 92, and a nose section 94. It will further be observed that the flighting on the side-by-side screw sections 84, 90 and 86, 92 are intermeshed, while the respective nose screw section 88, 94 diverge from one another as they enter and are complementally received within corresponding head sections 70, 72.

The inlet screw sections 84, 90 are double-flighted with the outwardly extending flighting convolutions 86, 98 being intermeshed along the entire length of the inlet section. The intermediate screw sections 86, 92 are likewise double-flighted with outwardly extending flighting convolutions 100, 102. In the embodiment shown in FIG. 2, convolutions 96, 98 are of essentially the same pitch as convolutions 100, 102. In other instances however, the convolutions 96, 98 may be of a different pitch than convolutions 100, 102. The nose screw sections 88, 94 are also double-flighted and are connected to intermediate screw sections 86, 92 at the end remote from inlet screw sections 84, 90. Flighting convolutions 104, 106 of sections 88, 94 are at a somewhat greater pitch than the corresponding flighting convolutions 100, 102 of the intermediate screw sections 86, 92. Preferably, the screw sections (particularly the inlet screw sections 84, 90 and intermediate screw sections 86, 92) comprise alternating helical flighting (i.e., alternating forward and reverse flighting) for creating additional shear on the product in the extruder barrel (not shown). A die is situated adjacent the ends of nose screws 88, 94. Any conventional pasta die may be used, depending upon the desired product shape and size. A particularly preferred pasta die is a three-vane twist die (die Model No. 45532, available from Maldari and Sons, Inc., Brooklyn, N.Y.) assembled onto a bell or pasta housing (such as Wenger Part No. 56260-1, available from Wenger Manufacturing, Inc.). Such an assembly is schematically depicted in FIG. 1 as pasta die housing 22.

The respective screw sections described above are mounted on elongated central drive shafts 108, 110. Each of the screws 42, 44 is supported for axial rotation adjacent the rearmost end of barrel 36. Referring to FIG. 2, it will be seen that screws 42, 44 are supported and powered by conventional bearings 112, 114 as well as motor, and gear reducer means (not shown).

Referring to FIG. 1, a venting device 20 for venting the barrel at intermediate head 54 is shown. Any venting device which is capable of drawing off gaseous products from the material being advanced through barrel 36 while at the same time preventing the release of the material itself from barrel 36 is suitable for the instant invention. One preferred venting device is disclosed in U.S. Pat. No. 5,059,439, incorporated by reference herein.

Referring to the drying assembly 14 illustrated in FIG. 1, first dryer 24 includes a first drying zone 116 and a second drying zone 118 which are capable of being maintained at different temperatures. The approximate boundary between zones 116 and 118 is represented by dashed line 120. Dryer 24 further includes an inlet 122, an upper conveyor 124, a lower conveyor 126, and an outlet 128. The upper runs of conveyors 124, 126 are shiftable in the directions indicated by the arrows. A variety of dryers are suitable for use as first dryer 24 in the instant invention, so long as the dryer is capable of heating to temperatures of at least about 150° F. It is particularly preferred to use dryer Model No. 43001-000 (Wenger Manufacturing, Inc.) as first dryer 24.

Second dryer 26 likewise includes an inlet 130, an upper conveyor 132, a lower conveyor 134, and an outlet 136. Conveyors 132, 134 are rotatable in the directions indicated by the arrows. A variety of dryers are suitable for use as second dryer 26 provided that they are capable of heating to temperatures of at least about 150° F. It is particularly preferred to use dryer model no. 43001-101 (Wenger Manufacturing, Inc.).

First cyclone separator 28 is operatively connected to a transport conduit 140, and includes a vessel 142, a fan 144, a standard rotary airlock 146, and a material outlet 148. Second cyclone separator 30 is likewise operatively connected to a transport conduit 152 and includes a vessel 154, a fan 156, a standard rotary airlock 158, and a material outlet 160. Both fans 144, 156 of cyclone separators 28, 30 are configured to create negative pressure within vessels 142, 154, thus drawing material into those vessels.

Conveyer assembly 32 includes a vibrating conveyer 162 and a conventional belt conveyer 164. Vibrating conveyer 162 slopes downwardly in the direction indicated by the arrow, while conveyer 164 is substantially horizontal, rotating in the direction indicated by the arrows.

In operation, the dry ingredients, namely a pasta-type flour (such as Durum, Semolina, or Soft Wheat) and optional materials such as potato starch, salt, and mono- and di-glycerides are fed into the preconditioner 16, whereupon moisture, in the form of water and/or steam is added to the dry ingredients. Preferably, the pasta flour is present in said dry ingredients (i.e., with no added moisture) at a level of from about 25–55% by weight, based upon the total weight of the ingredients taken as 100% by weight. In the preconditioner, a uniform mixture is created through the rotation of the mixing paddle shafts. Preferred preconditioning parameters are set forth in Table 1.

Material leaving the preconditioner is fed directly into inlet 38 of the twin screw extruder 18 and the screws 42, 44 are rotated in order to advance the material along the length of barrel 36 and to subject the material to increasing temperature and shear. In order to minimize shear on the product and thus minimize starch degradation, the shaft speed is preferably less than about 180 rpm. This is important for obtaining a product which will puff to a light texture. In order to ensure sufficient cook of the product under these minimal shear conditions, the mixture is preferably subjected to two zones of treatment in the extruder, namely a cooking zone and a downstream forming zone. The material is subjected to the highest temperature it will experience in the extruder in the cooking zone, whereas the temperatures experienced in the forming zone are generally below the maximum temperature of the cooking zone. Preferably, the extruder barrel is heated via hot water circulated through jackets on the extruder barrel (not shown). Preferred extrusion conditions are set forth in Table 1.

The cooked extrudate (represented by pieces 166 in FIG. 1) is cut in pasta die housing 22 as it emerges from the extruder 18 and drops into inlet funnel 138 of cyclone separator 28. Any conventional cyclone separator is suitable for use in the methods of the invention. Fan 144 creates a negative pressure within vessel 142, thus causing pieces 166 to be transported through conduit 140 and into vessel 142. While a negative air pressure is preferred, the pieces 166 can alternately be agitated by blowing them through a transport conduit, so long as the pieces 166 are subjected to agitation by air so as to reduce the clumping of the pieces 166.

Next, the air-agitated pieces 166 drop into airlock 146 and are released through separator outlet 148 into inlet 122 and onto upper conveyor 124 of first dryer 24. It is preferable that the pieces 166 be spread evenly upon the belt of conveyer 124. Furthermore, it is preferable that the depth of the pieces 166 on the belt of conveyer 124 (i.e., the bed depth) be less than about 5 inches deep. One way to achieve uniform spreading is by way of a pneumatic 45° oscillating product spreader. The upper run of conveyor 124 shifts in the direction indicated by the arrows, thus passing the pieces 166 through first drying zone 116 followed by passage through second drying zone 118. The pieces 166 are then dropped onto lower conveyor 126, also of first dryer 24. Again, it is preferred that the bed depth of the pieces 166 on the belt of conveyer 126 also be maintained at less than about 5 inches deep. The upper run of conveyor 126 rotates in the direction indicated by the arrows, passing the pieces 166 through second drying zone 118 for a second time, followed by a second passage through first drying zone 116. In the embodiment illustrated, the boundary 120 between drying zones 116,118 comprises a wall having openings through which the conveyers 124,126 pass (not shown). The boundary 120 is not tightly sealed, and thus there is some temperature variation throughout each zone. For example, the temperature in the region of zone 116 immediately adjacent boundary 120 may be hotter or cooler (depending on the temperature of the air diffusing from zone 118) than the region of zone 116 remote from boundary 120. In some instances, it may be preferred to use a dryer for dryer 24 which does not contain two separately-heated zones. This will depend upon the desired product as well as the equipment available to the manufacturer. The drying conditions for the first drying step are set forth in Table 1.

The semi-dried pieces 166 then exit first dryer 24 by way of outlet 128 and are dropped onto vibrating conveyer 162 which vibrates the pieces 166 (thus assisting in separating some of the pieces 166 which are clumped) in the direction indicated by the arrow. As the pieces 166 are dropped from conveyer 162, they are sprayed with 0.2% potassium sorbate (or some other mold inhibitor) by spraying mechanism 34. After spraying, the pieces 166 are then transferred through inlet funnel 150 of second cyclone separator 30. As was the case with fan 144 of cyclone separator 28, fan 156 creates a negative pressure within vessel 154, thus causing pieces 166 to be conveyed pneumatically through transport conduit 152 into vessel 154. Preferably, the temperature of the air during this transport of pieces 166 is from about 90–130° F. less than the temperature of the air in first dryer 24, and more preferably the transport of pieces 166 is carried out in ambient air temperatures. Again, while a negative air pressure is preferred, the pieces 166 can be blown to the second dryer by any suitable pneumatic device. Furthermore, any conventional cyclone separator is suitable for use as the second cyclone separator 30 in accordance with the invention.

The air-agitated pieces 166 then drop within vessel 154 to airlock 158 which releases the pieces 166 through cyclone separator outlet 160 into inlet 130 and onto upper conveyor 132 of second dryer 26. The upper run of conveyor 132 shifts in the direction indicated by the arrows, passing the pieces 166 through the dryer 26. The pieces 166 are then dropped onto lower conveyor 134, also of second dryer 26. The upper run of conveyor 134 shifts in the direction indicated by the arrows, passing pieces 166 through dryer 26 for a second drying pass. The drying conditions for the second drying step are set forth in Table 1.

Upon exiting dryer 26, the dried pasta pieces 166 can optionally be transferred to a toaster oven via a mechanical shaker for further drying and cooking (not shown). After drying in the toaster oven, the final product can be stored or further processed with flavorings and the like. Or, rather than further drying in the toaster oven, pieces 166 can immediately be processed or sold upon emergence from second dryer 26.

The final product can be hot air puffed into a light, fluffy, low-fat snack product. Any commercial hot air popcorn puffer of the Cretor variety is suitable, as well as high air velocity ovens such as the Jet-Zone variety of ovens. Preferred puffing conditions are set forth in Table 1. After puffing, the product is ready for any added seasonings, depending upon the final product. Some suitable seasonings include cheese, onion, garlic, vinegar and oil, ranch, nacho, etc.

Those skilled in the art will readily appreciate that the extruder described above can be provided with a wide variety of screw, die, and barrel structures, depending upon the desired pasta product. Furthermore, while the preferred method of the invention comprises partially drying an extrudate in a first drying apparatus followed by pneumatically transferring the partially dried extrudate to a second drying apparatus, the partially dried extrudate can alternately be returned to the first drying apparatus for the second drying step, if two separate dryers are not feasible. Finally, while the embodiment described utilizes two cyclone separators, any apparatus capable of pneumatically transferring, and thus agitating, the material is suitable for practicing the invention.

While the following Example describes exact processing conditions for five test runs, those skilled in the will realize that the methods according to the invention are not limited to those exact conditions. Table 1 sets forth the broad and preferred ranges of some of the processing conditions.

TABLE 1

|  | Broad Range | Preferred Range |
|---|---|---|
| PRECONDITIONING INFORMATION | | |
| Maximum Temperature of Material While in Preconditioner | about 110–170° F. | about 140–160° F. |
| Residence Time in Preconditioner | about 30 seconds to 3.5 minutes | about 45 seconds to 3 minutes |
| Preconditioner Small Shaft Speed | about 152–156 rpm | about 154 rpm |
| Preconditioner Large Shaft Speed | about 75–79 rpm | about 77 rpm |
| Steam Flow to Preconditioner | about 400–500 lbs/hr | about 430–480 lbs/hr |
| Water Flow to Preconditioner | about 450–550 lbs/hr | about 480–510 lbs/hr |
| EXTRUSION INFORMATION | | |
| Extruder Shaft Speed | less than about 175 rpm | less than about 150 rpm |
| Water Flow to Extruder (barrel injection) | about 325–375 lbs/hr | about 350–365 lbs/hr |
| Output Rate of Ingredients from Extruder | about 1900–2600 lbs/hr | about 2100–2300 lbs/hr |
| Cooking Zone Temperatures | about 180–220° F. | about 190–210° F. |
| Forming Zone Temperatures | about 190–220° F. | about 200–215° F. |
| Maximum Pressures in Extruder | about 750–900 psi | about 800–850 psi |
| Temperature of Material Emerging from Extruder | about 190–220° F. | about 200–215° F. |
| Extruder Workload Percentage | about 60–85% | about 65–80% |
| AIR AGITATION OF PRODUCT UPON EXITING EXTRUDER AND PRIOR TO ENTERING FIRST DRYING STEP | | |
| Air Velocity | about 1300–1400 ft$^3$/min. | about 1350 ft$^3$/min. |
| Length of Time of Air Agitation | about 2 seconds to 3 minutes | about 2 seconds to 12 minutes |
| FIRST DRYING STEP CONDITIONS (DOUBLE ZONE DRYER) | | |
| First Drying Zone Air Temperatures | about 150–210° F. | about 180–200° F. |
| Residence Time in First Drying Zone | about 10–20 minutes | about 14 minutes |
| Second Drying Zone Air Temperatures | about 150–210° F. | about 170–190° F. |
| Residence Time in Second Drying Zone | about 10–20 minutes | about 14 minutes |
| Relative Humidity of Air in Dryer of First Drying Step | at least about 20% | from about 30–40% |
| FIRST DRYING STEP CONDITIONS (SINGLE ZONE DRYER) | | |
| Air Temperatures | about 150–210° F. | about 175–195° F. |
| Residence Time | about 24–50 minutes | about 26–30 minutes |
| Relative Humidity of Air in Dryer of First Drying Step | at least about 20% | from about 30–40% |
| AIR AGITATION OF PRODUCT UPON EXITING FIRST DRYING STEP AND PRIOR TO ENTERING SECOND DRYING STEP | | |
| Air Velocity | about 1300–1400 psi | about 1350 psi |
| Length of Time of Air Agitation | about 5 seconds to 1 minute | about 15 seconds to 5 minutes |
| SECOND DRYING STEP CONDITIONS | | |
| Air Temperatures | about 150–210° F. | about 170–190° F. |
| Residence Time | about 5–20 minutes | about 9–11 minutes |
| Relative Humidity of Air in Dryer of First Drying Step | less than about 15% | less than about 6% |
| TOASTER OVEN CONDITIONS | | |
| Air Temperatures | about 190–250° F. | about 215–235° F. |
| Residence Time | about 30 seconds to 5 minutes | about 2 minutes |
| Relative Humidity of Air in Dryer of First Drying Step | less than about 15% | less than about 6% |
| HOT AIR EXPANSION CONDITIONS | | |
| Air Temperatures | about 350–480° F. | about 380–420° F. |
| Air Velocity | at least about 1600 ft$^3$/min. | about 1750–1850 ft$^3$/min. |

Table 2 sets forth the moisture content, fat content, and density of the material at various stages in the manufacturing process.

TABLE 2

|  | Broad Range | Preferred Range | Most Preferred Range |
|---|---|---|---|
| Out of Preconditioner | | | |
| Moisture Content[a] | about 16–24% | about 18–23% | about 20–22% |
| Fat Content[a] | less than about 8% | less than about 2% | less than about 1% |
| Out of Extruder | | | |
| Moisture Content[a] | about 30–42% | about 31–38% | about 32–36% |
| Fat Content[a] | less than about 8% | less than about 2% | less than about 1% |
| Density[b] | about 1.15–1.25 g/cm$^3$ | about 1.17–1.22 g/cm$^3$ | about 1.17–1.19 g/cm$^3$ |
| Out of 1st Dryer | | | |
| Moisture Content[a] | about 17–28% | about 19–27% | about 21–26% |
| Fat Content[a] | less than about 8% | less than about 2% | less than about 1% |
| Density[b] | about 1.10–1.2 g/cm$^3$ | about 1.12–1.18 g/cm$^3$ | about 1.13–1.15 g/cm$^3$ |
| Out of 2nd Dryer | | | |
| Moisture Content[a] | less than about 15% | about 8–15% | less than about 9–13% |
| Fat Content[a] | less than about 8% | less than about 2% | less than about 1% |
| Density[b] | about 1.05–1.15 g/cm$^3$ | about 1.08–1.13 g/cm$^3$ | about 1.09–1.12 g/cm$^3$ |
| Out of Toaster Oven | | | |
| Moisture Content[a] | less than about 15% | about 8–15% | less than about 9–13% |
| Fat Content[a] | less than about 8% | less than about 2% | less than about 1% |
| Density[b] | about 1.03–1.13 g/cm$^3$ | about 1.05–1.12 g/cm$^3$ | about 1.09–1.12 g/cm$^3$ |
| After Hot Air Expansion | | | |
| Moisture Content[a] | less than about 4% | less than about 3% | less than about 2% |
| Fat Content[a] | less than about 8% | less than about 2% | less than about 1% |
| Density[b] | about .25–.5 g/cm$^3$ | about .3–.45 g/cm$^3$ | about .35–.42 g/cm$^3$ |

[a]Percent weight based on weight of the product taken as 100% by weight.
[b]Refers to true or actual density of product rather than bulk density.

The following examples set forth preferred extrusion and dryer apparatuses and methods in accordance with the invention. It is to be understood that the invention is not so limited and nothing in the examples should be taken as a limitation upon the overall scope of the invention.

EXAMPLES

In this test, five runs were carried out, each run using a different recipe as set forth in Table 3.

TABLE 3

|  | RECIPE NUMBER | | | | |
|---|---|---|---|---|---|
| INGREDIENTS (% by wt) | 1 | 2 | 3 | 4 | 5 |
| Wheat Flour (Durum) | 0.00 | 20.35 | 16.90 | 0.00 | 25.45 |
| Wheat Flour (Semolina) | 20.37 | 0.00 | 0.00 | 23.00 | 0.00 |
| Wheat Flour (Soft Wheat) | 20.34 | 20.35 | 16.50 | 23.00 | 25.45 |
| Tapioca Flour | 20.34 | 20.35 | 16.50 | 10.00 | 7.50 |
| Rice Flour | 13.00 | 13.00 | 16.50 | 12.90 | 8.00 |
| Potato Starch | 10.00 | 10.00 | 16.50 | 10.00 | 7.50 |
| Corn Flour | 15.35 | 15.35 | 16.50 | 20.50 | 20.50 |
| Mono & Diglycerides | 0.60 | 0.60 | 0.60 | 0.60 | 0.60 |

The dry ingredients of each recipe were mixed in a Wenger Model #61001-000 mixer bin (Wenger Manufacturing, Sabetha, Kans.) for approximately 4 minutes. After mixing, the ingredient blend was fed pneumatically via a rotary discharge valve (Premium Pneumatic Inc., Sabetha, Kans.) into a holding/surge bin from which it was emptied via a slide gate into a live bin/volumetric feeder (Wenger Model #66460-103). From the live bin, the blend was fed volumetrically by a variable speed screw conveyor to a Wenger Model #66460-013 double diameter, preconditioning cylinder having a total of 54 shaft-mounted beaters.

The preconditioned material was then fed into a Wenger Model TX138 twin screw extruder with its screw shaft coupled via a gear unit to a 200 kW Reliance Mak Pak plus DC Electric Motor (Model #RE-045, Reliance Electric Industrial Company, Cleveland, Ohio). The DC Motor had a speed reduction range of 5:1. The screws had a diameter of 106.25 mm and a length to diameter (L/D) ratio of 27. The TX138 machine was of the type illustrated in FIG. 2, and the configuration included the following Wenger parts: head 1, 56316-001; heads 2–4 and 6–7, 56307-001; head 5, 56343-003; and head 8, 56319-001. The device also included rotating elements from inlet to outlet, 56316-001, 56325-003, 56325-003, 56325-003, 56324-101, 56324-103 F, 56324-105 F, 56324-003, 56325-003, 56325-003, 56324-101, 56324-103 F, 56324-105 F, 56324-103 R, 56324-101 R, 56324-103 R, 56325-103, 56325-003, 56325-003, 56325-003, 56325-003, 56325-003, and 56321-005. Barrel 5 of the extruder included a venting device (Wenger Model No. 56780-001). The jacketed heads were heated with hot water. Two die holder/bell housing assemblies (Wenger Part #56260-1) were coupled to the outlet end of the barrel by means of a Wenger Part #56767 adapter/spacer. A three-vane twist die (die #45532, Maldari and Sons, Inc., Brooklyn, N.Y.) was attached to one of the bell housing assemblies. The wet extrudate exiting from each die was cut by two blades attached to opposite ends of the knife holder and rotating in a counterclockwise direction on the die face.

In carrying out the runs described below, the dry ingredients were fed into the extruder barrel where the material was subjected to increasing temperatures, pressure, and shear. In addition, water was fed into the interior of the extruder barrel. The emerging extrudate was cut, and the cut products were transferred pneumatically in a siliconized tubing hose to be dried.

The drying assembly set-up was of the type illustrated in FIG. 1. The cut product was pneumatically transferred via a cyclone separator to a dryer (Wenger Model #43001-000) which had two drying sections (zone 1 and zone 2). A pneumatic 45° oscillating product spreader evenly spread the wet extrudate product on the top conveyor belt. The product was passed twice through this dryer (i.e., the product was passed through zone 1 and zone 2, and then transferred to a lower conveyor belt and passed again through zone 2 followed by a second pass through zone 1). Upon exiting the first dryer, the semi-dried pellets were sprayed with 0.2% potassium sorbate and then pneumatically transferred via a cyclone separator (having a negative pressure of 1350 ft³/min) to the top belt of the second dryer (Wenger Model #43001-101) which contained only one drying zone. The product was passed twice through this dryer. The dried pasta pellets were then conveyed to a bucket elevator and transferred to the top belt of a toaster oven (Wenger Model #8410-017) for final drying of the pasta snack pellet.

The results of these production runs are set forth in Table 4. The drying conditions were the same for each run and are set forth in Table 5.

TABLE 4

|  |  | Run #1 | Run #2 | Run #3 | Run #4 | Run #5 |
|---|---|---|---|---|---|---|
| DRY RECIPE INFORMATION |
| Feed Rate | lbs/hr | 2200 | 2200 | 2200 | 2200 | 2200 |
| Feed Screw Speed | rpm | 76 | 76 | 76 | 76 | 76 |
| PRECONDITIONING INFORMATION |
| Preconditioner Small Shaft Speed | rpm | 154 | 154 | 154 | 154 | 154 |
| Preconditioner Large Shaft Speed | rpm | 77 | 77 | 77 | 77 | 77 |
| Steam Flow to Preconditioner | lbs/hr | 420 | 420 | 420 | 420 | 420 |
| Water Flow to Preconditioner | lbs/hr | 490 | 490 | 490 | 490 | 490 |
| EXTRUSION INFORMATION |
| Extruder Shaft Speed | rpm | 142 | 142 | 142 | 142 | 142 |
| Extruder Motor Load | % | 80 | 80 | 80 | 80 | 80 |
| Water Flow to Extruder (barrel injection) | lbs/hr | 365 | 365 | 365 | 365 | 365 |
| Control/Temperature 2nd Head | ° F. | HW/120 | HW/120 | HW/120 | HW/120 | HW/120 |
| Control/Temperature 3rd Head | ° F. | HW/120 | HW/120 | HW/120 | HW/120 | HW/120 |
| Control/Temperature 4th Head | ° F. | HW/195 | HW/195 | HW/195 | HW/195 | HW/195 |
| Control/Temperature 5th Head | ° F. | HW/190 | HW/190 | HW/190 | HW/190 | HW/190 |
| Control/Temperature 6th Head | ° F. | HW/110 | HW/110 | HW/110 | HW/110 | HW/110 |
| Control/Temperature 7th Head | ° F. | CW/80 | CW/80 | CW/80 | CW/80 | CW/80 |
| Control/Temperature 8th Head | ° F. | CW/80 | CW/80 | CW/80 | CW/80 | CW/80 |
| Die Pressure | psi | 800 | 800 | 800 | 800 | 800 |
| Recipe Number | # | 1 | 2 | 3 | 4 | 5 |

TABLE 5

Drying Conditions for Runs 1–5.

DRYING CONDITIONS

|  |  | Residence Time (Min) | Temperature (° F.) | Relative Humidity (%) |
|---|---|---|---|---|
| Dryer #1 | Zone #1 | 14[a] | 190 | 25 |
|  | Zone #2 | 14[a] | 180 | 25 |
| Dryer #2 |  | 10[a] | 180 | 0[b] |
| Toaster Oven |  | 2 | 225 | 0[b] |

[a]Denotes total time. Each pass is one-half of this total time.
[b]Relative humidity varies with ambient atmospheric conditions and it ranges between 3 to 6%.

I claim:

1. A method for making a non-fried pasta product comprising the steps of:
    (a) introducing ingredients including pasta flour into the barrel of an extruder equipped with a flighted, rotatable screw and an extrusion die;
    (b) rotating said screw to sequentially advance said ingredients along the length of said barrel and through said extrusion die to yield an extruded product;
    (c) partially drying the extruded product using heated air having a temperature of from about 150–210° F.;
    (d) agitating the partially dried product in agitating air having a temperature less than the temperature of said heated air during said partially drying step (c), said agitating being carried out for a time period of from about 5 seconds to about 1 minute; and
    (e) further drying the partially dried, air-agitated product using heated air having a temperature of from about 150–210° F.

2. The method of claim 1, wherein said partially drying and further drying steps are carried out in physically separate drying devices.

3. The method of claim 1, wherein said agitating step comprises air conveying the partially dried product to a drying apparatus for said further drying step.

4. The method of claim 3, wherein said air conveying is carried out using air having a velocity of from about 1300–1400 ft³/min.

5. The method of claim 1, wherein the temperature of said agitating air is from about 90–130° F. less than said first air temperature.

6. The method of claim 1, wherein said agitating air temperature is ambient temperature.

7. The method of claim 1, wherein the product resulting from step (c) has a total moisture content of from about 17–28% by weight based upon the total weight of the product taken as 100% by weight.

8. The method of claim 1, wherein the product resulting from step (e) has a total moisture content of less than about 15% by weight based upon the total weight of the product taken as 100% by weight.

9. The method of claim 1, further including the step of drying the product resulting from step (e) in an oven.

10. The method of claim 9, wherein the product of said oven-drying step has a total moisture content of less than about 15% by weight based upon the total weight of the product taken as 100% by weight.

11. The method of claim 1, wherein the product of step (c) has a total fat content is less than about 8% by weight based upon the total weight of the product.

12. The method of claim 1, wherein the product of step (e) has a total fat content of less than about 8% by weight based upon the total weight of the product.

13. The method of claim 1, wherein the drying of said extruded product in step (c) takes place in at least two drying zones, said zones comprising a first zone and a second zone, said first zone drying having heated air of a temperature different than the heated air of said second zone drying.

14. The method of claim 1, wherein drying step (c) is carried out for a time period of from about 20–40 minutes.

15. The method of claim 1, wherein drying step (e) is carried out for a time period of from about 5–20 minutes.

16. The method of claim 1, wherein the product resulting from step (c) has an actual density of from about 1.10–1.2 g/cm³.

17. The method of claim 1, wherein the product resulting from step (e) has an actual density of from about 1.05–1.15 g/cm³.

18. The method of claim 1, further including the step of introducing said ingredients into a preconditioner prior to introducing said ingredients into said extruder barrel, said preconditioner elevating the temperature of said ingredients to a temperature of from about 110–170° F.

19. The method of claim 18, said preconditioner retaining said ingredients at said temperature for a period of from about 45 seconds to about 3 minutes.

20. The method of claim 1, wherein said agitating step is carried out in a cyclone separator.

21. The method of claim 1, wherein said screw is rotated at a speed of less than about 175 rpm.

22. The method of claim 1, wherein said ingredients obtain a maximum temperature in said extruder barrel of from about 180–220° F.

23. The method of claim 1, wherein said ingredients are advanced through said extruder barrel at a rate of from about 1900–2600 lbs/hr.

24. The method of claim 1, wherein said partially drying step (c) takes place at a relative humidity of at least about 20%.

25. The method of claim 1, further including the step of injecting water into said extruder barrel during said introducing and rotating steps.

26. The method of claim 1, wherein said pasta flour is selected from the group consisting of Durum, Semolina, and Soft Wheat, and said pasta flour is present at a level of from about 25–55% by weight based on the total weight of said ingredients taken as 100% by weight.

27. The method of claim 1, further including the step of hot air expanding the product of step (e), said expanding step comprising subjecting the product resulting from step (e) to air having a temperature of from about 350–480° F. and a velocity of at least about 1600 ft³/min.

28. The method of claim 27, wherein the product of said expanding step has an actual density of from about 0.25–0.5 g/cm³ and a total fat content of less than about 2% by weight based upon the total weight of the product.

29. The method of claim 1, wherein said product resulting from step (b) has a temperature of from about 190–220° F. upon passing through said extrusion die.

30. The method of claim 1, wherein the product resulting from step (b) has a total moisture content of from about 30–42% by weight based upon the total weight of the product.

31. The method of claim 1, wherein said screw comprises alternating helical flighting.

32. The method of claim 1, wherein said partially drying step is carried out in a drying device having a bed and said extruded product is placed on said bed at a product bed depth of less than about 5 inches.

33. The method of claim 1, wherein said extruder has a workload percentage of from about 65–80% during said rotating step.

34. A method for making a non-fried pasta product comprising the steps of:
   (a) introducing ingredients including pasta flour into the barrel of an extruder equipped with a flighted, rotatable screw and an extrusion die;
   (b) rotating said screw to sequentially advance said ingredients along the length of said barrel and through said extrusion die to yield an extruded product having a moisture content of from about 30–42% by weight, based upon the total weight of the extruded product taken as 100% by weight;
   (c) partially drying the extruded product using heated air of a first temperature;
   (d) agitating the partially dried product in agitating air having a temperature less than said first temperature; and
   (e) further drying the partially dried, air-agitated product using heated air of a second temperature greater than said agitating air temperature so as to yield a final product having an actual density of from about 1.05–1.15 g/cm³ and a moisture content of less than about 15% by weight, based upon the total weight of the final product taken as 100% by weight.

* * * * *